Sept. 25, 1934.   J. F. COBB   1,974,484
JOURNAL BEARING
Filed Dec. 30, 1927   2 Sheets-Sheet 2
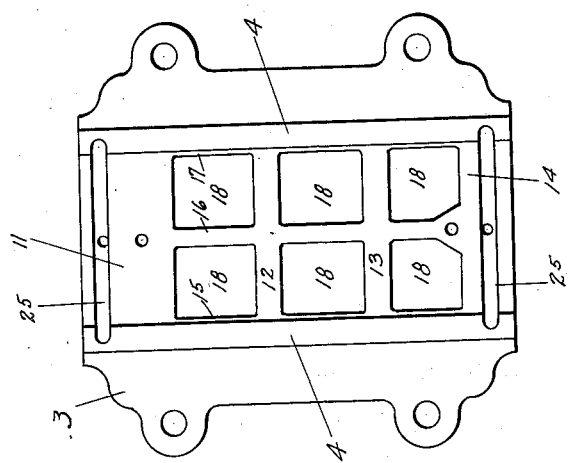
Fig. IV
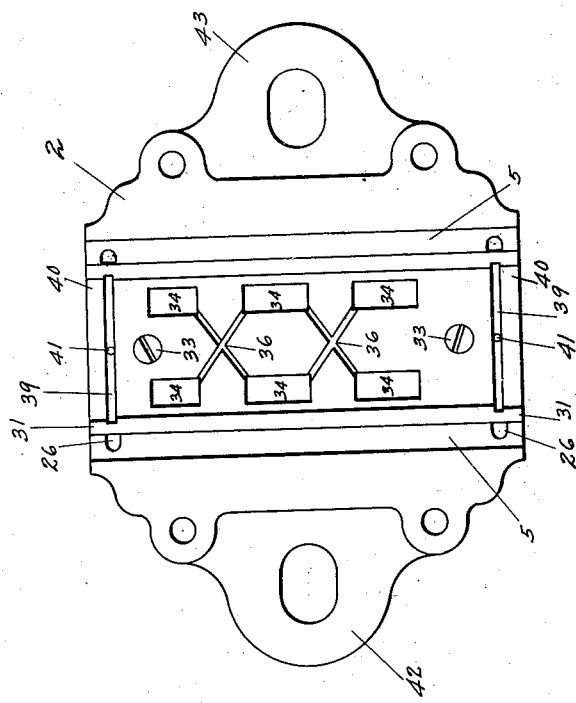
Fig. III
Inventor;
J. Forrest Cobb,
By Atkins & Atkins,
Attorneys.

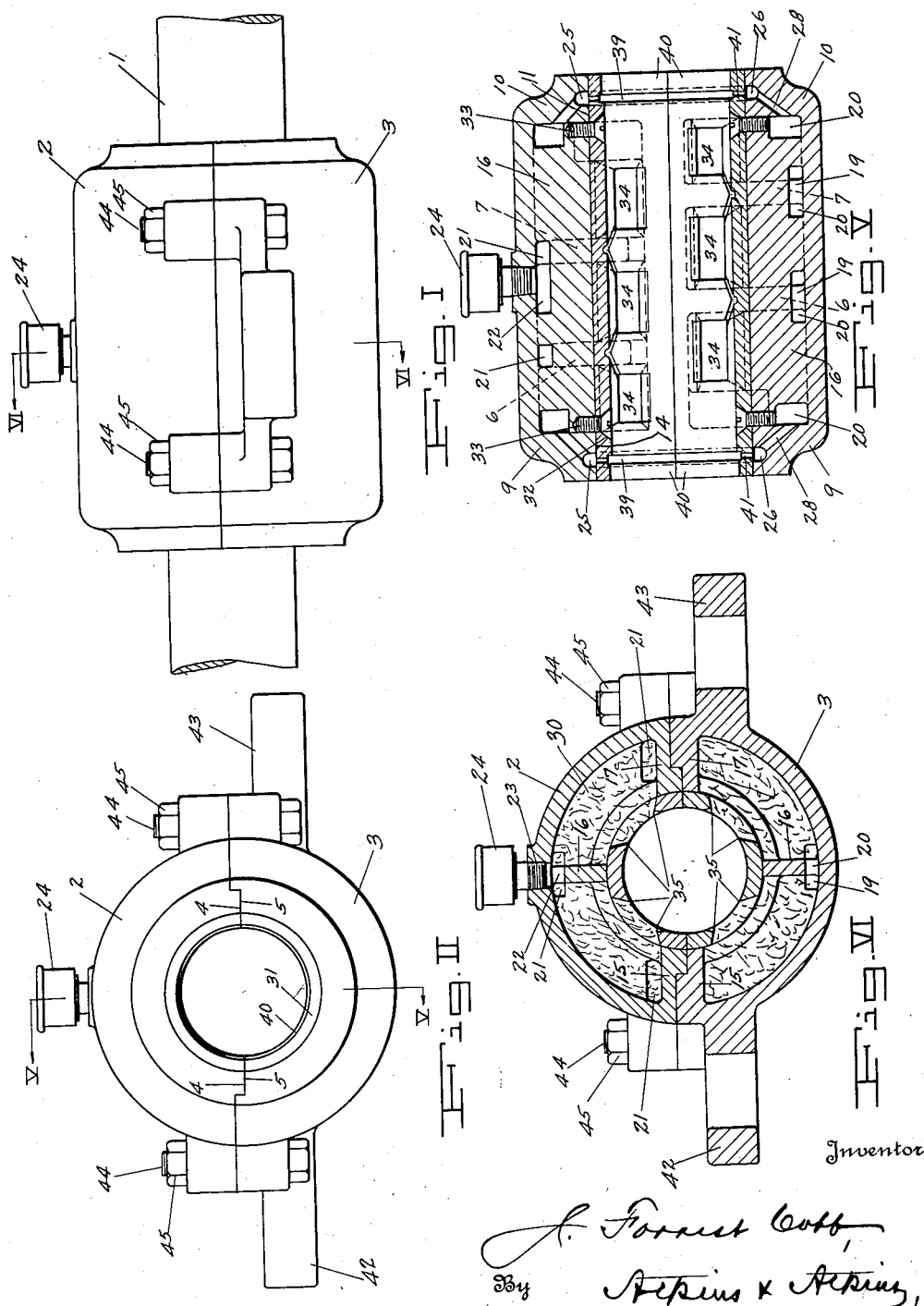

Patented Sept. 25, 1934

1,974,484

UNITED STATES PATENT OFFICE 1,974,484

JOURNAL BEARING

James Forrest Cobb, Portland, Oreg.

Application December 30, 1927, Serial No. 243,624

17 Claims. (Cl. 308—121)

My invention relates to journal bearings of the self lubricating wiper type, and has for its main object the production of a bearing that is specially designed and adapted for use in temperature higher than atmospheric air, such as that in a heated kiln for drying lumber, for example.

Another and specific object of my invention is to provide in such a journal bearing means for spreading a film of lubricating material, such as oil or grease, evenly over the entire surface of a shaft where it comes into contactual relationship with its bearing.

Another object of my invention is to provide means for collecting and saving without waste any residual portion of the lubricant, if any, that may escape as from between the contiguous surfaces of the journal and its bearing, the same being led back into the lubricant reservoir in the bearing.

Another object of my invention is to provide a bearing having a body part with separate chambers therein disposed around a cylindrical interior, and liners with apertures corresponding in size and disposition to the chambers, the apertures having beveled faces to permit compacting of a stuffing material against a rotative shaft disposed in the bearing.

What constitutes my invention will be hereinafter described in detail and succinctly defined in the appended claims.

In the accompanying drawings, wherein I illustrate, by way of example only, my invention in present preferred form of embodiment, Figure I is a side elevation of my bearing complete on a rotative shaft.

Figure II is an end view of the subject matter of Figure I.

Figure III is a top plan view of the exposed interior of the lower half of the bearing body shown in Figure I, with its removable bushing in place.

Figure IV is a corresponding view of the upper half without its bushing.

Figure V is a longitudinal section on the line V—V of Figure II, the shaft and stuffing material being omitted.

Figure VI is a transverse section on the line VI—VI of Figure I, complete, except that lubricant chambers are shown as filled with a stuffing material.

Referring to the numerals on the drawings, 1 indicates, by way of example, a shaft that is shown as revolubly mounted in one of my bearings which is fixed to any suitable support, in service.

My bearing comprises a partite body, preferably divided into two parts 2 and 3, consisting of castings preferably of iron, which, as bearing members, may be halves of a cylinder that are substantially identical except that one has longitudinal aligning lugs 4 and the other has correspondingly disposed coextensive recesses 5 to receive and hold the lugs 4, said lugs and recesses preferably constituting a ship lap joint.

The body parts 2 and 3 are complementary to each other, each comprehending a preferably semicylindrical concavity or lining-seat that is partially defined, preferably, as shown in Figure V, by a plurality of intermediate transverse walls 6 and 7, for example, and by opposite end walls 9 and 10, which support semicylindrical facings 11, 12, 13 and 14, respectively.

The definition of each lining-seat is completed by longitudinal walls, 15, 16, and 17 which, with the walls 6, 7, 9, and 10, laterally define individual lubricant chambers 18, that are disposed in series and which may be substantially identical in shape, size, and dimensions.

The chambers 18 of the lower body part 3 are preferably rendered intercommunicating, as by apertures 19 in the walls 6 and 7, respectively, and by apertures 20 in the intermediate longitudinal wall 16, all of said apertures being disposed substantially at the bottom of the interior of the part 3. The chambers 18 of the upper body part 2 are preferably made intercommunicating by apertures 21 in the walls 6 and 7, respectively, and by an aperture 22 in the wall 16 located below a threaded opening 23 which is provided for the accommodation, in service, of a gravity-feed oil cup 24.

Drainage grooves 25 in the terminal facings 11 and 14, respectively, lead, respectively, into drainage grooves 26 in the corresponding walls of the lower body part 3, when the halves are assembled. The walls which bound on the outside said drainage grooves 25 and 26, respectively, coact with the bushings of the respective lining-seats, hereinafter specified, to form a substantially effectual dam for preventing escape of lubricant beyond the ends of the bearing, and each of the drainage grooves 26 of the lower body part 3 has vents 28 leading from its bottom into the interior of the lubricant chambers 18 in the said body part 3, for the return of liquid lubricant to said chambers.

Each of the chambers 18 of both body parts 2 and 3 is filled with stuffing material 30 consisting of a shredded substance, preferably wool, which serves to restrict discharge of liquid lubricant from the chamber and to constitute a wiper for spreading the lubricant in a thin uniform film over so much of the surface of the shaft 1 as rotates in the enclosing bearing.

As already specified, the body parts 2 and 3 of the bearing are preferably made substantially identical in form, but when they are assembled into a bearing they are reversed end for end, which reversal brings the chambers 18 of each part into staggered relationship to the chambers of the other part. The reason for providing for such relationship will be apparent from what follows.

Each lining-seat is furnished with a close fitting concave semicylindrical liner or bushing 31, which is contemplated herein as made of Babbitt-metal, and whose inner surface in the assembled bearing makes close bearing contact with the shaft 1. Each of the bushings 31 is preferably provided with countersunk openings 32 for reception of headed screws 33 for uniting it to its bearing half, and with a series of openings 34, respectively corresponding in number and disposition and substantially in shape and extreme dimensions to the chambers 18.

The bushings 31 are provided with openings 34 each having beveled walls which respectively define next to the shaft 1 a relatively sharp edge 35. The construction thereby effected admits to a certain degree of compacting of the body of the stuffing material 30 within each chamber 18, so as to hold it in place therein for its more effectual wiping contact with the shaft 1.

The edges 35 of the bushings 31 may lie in close juxtaposition to the shaft or be slightly removed therefrom, each by an undercut when desired as shown in respect to four of the edges 35 in Figure VI, the provision of the undercuts being made to prevent forcing of lubricant between the joints between the two bushings, irrespective of the direction of rotation of the shaft 1.

The openings 34 of each of the series thereof that are next adjacent, may be made intercommunicating by cross grooves 36 sunk in the bearing faces of the bushings 31, respectively, as shown in Figure III.

The bushings 31 are, for convenience and economy of manufacture, made identical in form, and may be cast in the same mold, but each is made conformable to the configuration and correlation of the chambers 18 of the lining-seats whose terminal facing 11 is wider than its facing 14 at the other end. When so constructed, the bushings are rendered reversible end for end and in their respective lining-seats, with the result that when so reversed and assembled in the reversed bearing halves, as they are, in service, the openings 34 are brought into like staggered relationship as shown in Figure V to correspond with the staggered disposition of the chambers 18 as has been specified. Consequently, the stuffing material 30 of each chamber 18 protruding through its opening 34 in the upper part 2 is caused to wipe against a portion of the periphery of the shaft 1 that is opposite one of the facings in the lower part 3.

By this provision of a staggered relationship between the openings 34 the effectiveness of the cross grooves 36 for spreading the lubricant evenly over the face of each bushing is increased, with the result of contributing to the efficacy of the lubricating function of the bearing. In other words, the rotation of the shaft 1 wipes lubricating material (oil) from the wool waste in the openings 34, say of the part 2, and deposits a portion of it on the facing 12 or 13 of the other part 3 and in the grooves 36 which connect with adjacent openings 34, with the result of effectually distributing oil between the bearing surfaces throughout the bearing.

It is important to observe that each bushing 31 actually terminates at the inner wall that defines circumferential grooves 39, respectively, in the bushing near its opposite ends. Beyond the said inner wall of the groove 39, the bushing is provided with an extension 40 of slightly increased internal diameter so that it will not contact with the shaft 1. The occasion for the extension of each bushing beyond the inner wall of the groove 39 is to provide for the accommodation in the assembled bushings of a groove 39 that is of annular shape so as to accommodate it to perform the function of a receptacle that is adapted to catch any leakage of oil which may occur from between the contacting surfaces of the shaft 1 and its bushng as well as from between each lining-seat and its bushing. Each groove 39 is, in order to keep it properly drained, provided, at substantially its lowest point, with a drainage vent 41, that communicates, as through a groove 26 and vent 28, with the chamber 18 in the lower body part 3 that is next adjacent to it.

The chambers 18 in the lower body part 3 comprise reservoirs for lubricant which may be supplied to the stuffing material in them when the bearings are first put into use or which is supplied by gravity drainage around the shaft through the drainage grooves 39 and vents 41 at the ends of the liners, and also by the rotation of the shaft. The shaft thus receives a film of lubricant primarily from the stuffing material in the upper half of the bearing, which film may be transferred to the lower chambers of the body part 3 by shaft rotation with the aid of the grooves 36 which drain to the chambers 18. Secondarily the shaft receives a film of lubricant by wiping contact with the stuffing material in the lower chambers.

The presence in the respective body parts 2 and 3 of vents 41 also provides for admission of outside air into the chambers 18 and between the contacting bearing surfaces between the shaft 1 and the bushings 31 which surround it. The presence of the vents 41 prevents, in operation, any suction, or the forming of a vacuum in the bearing, which might tend to suck into the bearing, with injurious effect upon lubrication, any water formed by condensation from the atmosphere on the shaft outside of the bearing.

For lending completeness to this specification, it may be added that the lower bearing half 3 is preferably provided on its opposite sides with means, for example slotted ears 42 and 43, by which it may be bolted or otherwise secured to any suitable supporting foundation. Moreover, the two bearing halves are united in operative assemblage as by threaded bolts 44 inserted through apertures provided for their reception at the four corners, substantially, of the respective body parts 2 and 3, and secured therein, respectively, by nuts 45.

In view of the foregoing specification, the operation of my device may be briefly described as follows:

In service, the bearing is assembled in supporting position upon the shaft 1, for example, as shown in Figure I, and thereupon rotation of the shaft insures its lubrication within the bearing in the following manner.

Liquid lubricant or oil is kept supplied by gravity to the chambers 18, respectively, from a storage source of supply represented by the oil cup 24 from which discharge of the lubricant is made in properly regulated flow as by a commonly used wick feed oil cup.

The contents of said oil cup flow by gravity directly into the chamber 18 of the upper body part 2 that is immediately below it, and is conducted thence about the shaft 1 into the chambers 18 of the lower body part 3. The flow of lubricant from the oil cup to the bearing is effected gradually, and is supplied, by proper regulation, in such quantity as is needed, to the stuffing material 30 in the several chambers 18. Besides that, when the bearing is first installed for operation, an initial supply of a modicum of lubricant or priming for the several chambers 18 is provided independently of the oil cup 24.

While it is in rotation, the shaft 1 takes oil from the chambers 18 supplied through the capillarity of the stuffing material 30, which, protruding through the several openings 34 against the shaft, wipes the lubricant over the surface thereof, and distributes it thereon, through aid of the grooves 36, with drainage therefrom through the vents 41, as has been specified.

The staggered disposition of the openings 34 and the provision of the cross grooves 36 cooperate to effect even distribution of a continuous film of lubricant between the entire contacting surfaces of each bushing 31 and the shaft 1. So much, if any, of the lubricant as may escape at either end of the bushing 31, on either side of it as already explained, is caught by one of the two grooves 39 that are provided at the opposite ends thereof, whence it is conducted back into the chambers 18 through the vents 41 communicating therewith, respectively, so that no loss of lubricant occurs.

By my invention, in effectually providing against loss of lubricant as in the manner just stated, the distinctive advantage is gained of preventing injurious consequences which might otherwise result from the use of the bearing in an atmosphere of high temperature, which is one of the objects of my invention.

The effect of heat upon a liquefiable lubricant to affect its degree of liquidity in proportion to temperature is well recognized in the art relating to the lubrication of machinery, and constitutes, in part, the basis of a commercial demand for my invention.

A properly regulated supply of fresh oil is kept gradually feeding from the oil cup 24 to the bearing surfaces about the shaft 1, and thence to the lower chambers 18, with the result of preventing a glazing or hardening of the oil in the stuffing material 30 which without provision of means to prevent, tends to occur where said material makes contact with the shaft 1.

It is to be understood that this invention is not limited to the exact design and form illustrated and described which are subject to modification within the principle of my invention and includes within its scope whatever changes fairly come within the terms or the spirit of the appended claims.

What I claim is:

1. A journal bearing comprising the combination with a partite body having complementary concavities and corresponding bushings fitted therein so as to encompass and support a rotative shaft, of lubricant chambers in the body extending substantially its full length and respectively containing stuffing material, and apertures in the bushings corresponding in size and relative disposition with the chambers, said chambers being arranged in series and in staggered relationship towards one another in said series.

2. A journal bearing comprising the combination with a pair of reversible body parts each having a corresponding series of intercommunicating lubricant chambers so disposed in each body part as to bring them individually in staggered relationship upon union of the reversed body parts, and semi-cylindrical lining-seats in the respective body parts, of reversible bushings in said respective lining-seats, having apertures conformable in size and disposition to said lubricant chambers, stuffing material in said chambers, respectively, and means of supplying liquid lubricant to said chambers and from them by aid of the stuffing material to a shaft when it is rotated in said bushings.

3. A journal bearing comprising the combination with a pair of reversible body parts each having a corresponding series of intercommunicating lubricant chambers so disposed in each body part as to bring them individually in staggered relationship upon union of the reversed body parts, and semi-cylindrical lining-seats in the respective body parts, of reversible bushings in said respective lining-seats, having apertures conformable in size and disposition to said lubricant chambers, cross grooves in the face of each bushing connecting said apertures, respectively, stuffing material in said chambers, respectively, and means of supplying liquid lubricant to said chambers and from them by aid of the stuffing material to a shaft when it is rotated in said bushings.

4. A journal bearing comprising the combination with a chambered body having a cylindrical interior, means of liquid lubricant supply thereto, lining-seats therein, and apertured bushings in said seats, of annular drainage grooves coaxial with the interior of the body part defined in the ends of the body part between it and its bushings, and means of drainage communication between said grooves, respectively, and the interior of the body part.

5. A journal bearing comprising the combination with a chambered body having a cylindrical interior, means of liquid lubricant supply thereto, lining-seats therein, and apertured bushings in said seats, of annular drainage grooves coaxial with the interior of the body part defined in the ends of the body part between it and its bushings, and means of drainage communication between said grooves, respectively, and the interior of the body part, said bushings being also provided with circumferential internal grooves having drainage vents communicating with the interior of the body part.

6. A journal bearing comprising the combination with a chambered body having a cylindrical interior, means of liquid lubricant supply thereto, lining-seats therein, and apertured bushings in said seats, of annular drainage grooves coaxial with the interior of the body part defined in the ends of the body part between it and its bushings, and means of drainage communication between said grooves, respectively, and the interior of the body part, said bushings being also provided at opposite ends with circumferential internal grooves therein, having drainage vents communicating with the interior of the body part and formed in cylindrical extensions of the bushings of diameter larger than that of the cylindrical bearing face of the conjoined bushings.

7. A journal bearing comprising a chambered body having a cylindrical interior, and an apertured lining therefor, in combination with means for communicating liquid lubricant from the chambers of the body by wiping contact between a shaft journalled in the bearing, and stuffing material confined in said chambers, of means provided at the respective ends of the bearing for catching leakage of lubricant and returning it to the interior of the bearing, and means for preventing suction action from said leakage catching means into the bearing through rotation of said shaft by maintenance of atmospheric pressure within the bearing.

8. A journal bearing comprising the combination with a body having a plurality of separate chambers, and a lining therefor corresponding in size and disposition to the chambers in the body, of stuffing material in said chambers, respectively, a series of apertures in the lining extending substantially the full length of the bearing and bevel faces provided in the lining around each of said apertures, adapted to compact the stuffing material advantageously for wiping contact with a shaft journalled in said lining.

9. A journal bearing comprising a chambered body provided on one side, with means for lubricating a shaft journaled within the bearing, by wiping contact between the shaft and capillary material that is contained within the bearing chambers, staggered lubricating means on another side of said body for distributing the lubricant on the opposite side of the bearing by the rotation of the shaft, and means for conveying lubricant, which tends to leak out the ends of the bearing, back into the bearing chambers, said means comprising two annular grooves in substantially the same plane at each end of the bearing, the inner grooves being open to the atmosphere.

10. A journal bearing comprising a chambered body provided on one side with means for lubricating a shaft journaled within the bearing, by wiping contact between the shaft and capillary material that is contained within the bearing chambers, staggered lubricating means on another side of said body for distributing the lubricant on the opposite side of the bearing by the rotation of the shaft, and means for conveying lubricant, which tends to leak out the ends of the bearing, back into the bearing chambers, said means comprising two annular grooves in the same plane at each end of the bearing, the inner groove between the shaft and the bushing being open to the atmosphere and the outer groove being between the bushing and the body part.

11. A journal bearing comprising a body part containing lubricating material, having a bushing, means for lubricating a rotative shaft journaled within the bearing, and means for draining lubricant tending to leak out the ends of the bearing, said means consisting of grooves between the body part and the bushing and between the bushing and the shaft, which grooves drain lubricant to chambers within the bearing.

12. A journal bearing comprising a body part containing lubricating material, having a bushing, means for lubricating a rotative shaft journaled within the bearing, and means for draining lubricant tending to leak out the ends of the bearing, said means consisting of annular grooves between the body part and the bushing and between the bushing and the shaft, which grooves drain lubricant to chambers within the bearing.

13. A journal bearing comprising a body part containing lubricating material, having a bushing, means for lubricating a rotative shaft journaled within the bearing, means for draining lubricant tending to leak out the ends of the bearing, said means consisting of complementary grooves between the body part and the bushing and between the bushing and the shaft, which grooves drain lubricant to chambers within the bearing, and means for maintaining atmospheric pressure within the interior of the bearing.

14. A journal bearing comprising a body part containing lubricating material, having a demountable bushing, means for lubricating a rotative shaft journaled within the bearing, and means for draining lubricant tending to leak out the ends of the bearing, said means consisting of grooves between the body part and the bushing and between the bushing and the shaft, which grooves drain lubricant to the interior of the bearing.

15. A journal bearing comprising the combination with a chambered body having a cylindrical interior, means of liquid lubricant supply thereto, lining-seats therein, and apertured bushings in said seats, of double annular drainage grooves coaxial with the interior of the body part defined in the ends of the body part between it and its bushings, and means of drainage communication between said grooves, respectively, and the interior of the body part, said bushing being also provided with circumferential internal grooves having drainage vents communicating with the interior of the body part, all substantially as specified.

16. A journal bearing comprising a body chambered above and below and open to atmospheric pressure and having demountable sleeves, said bearing being provided with means for lubricant supply primarily to the upper side of a shaft journaled within the bearing, said means being operative by wiping contact between the shaft and stuffing material contained within the upper bearing chambers, said upper and lower chambers being in staggered relationship to one another, the lower chambers receiving lubricant around the shaft from those on the upper side of said body.

17. A journal bearing comprising two body parts, each having a plurality of chambers, bushings for said body parts respectively providing a cylindrical interior for receiving a rotative shaft, said bushings having apertures corresponding in size and disposition to said chambers, stuffing material in said chambers and in wiper contact with said shaft through said apertures, the chambers in the upper body part being separated from the chambers in the lower body part, the chambers in the lower body part being staggered in relation to the chambers in the upper body part, means for primary lubricant supply to the stuffing material in the chambers of the upper body part, said lower chambers receiving lubricant from said upper chambers around the shaft.

J. FORREST COBB.